United States Patent
Masini et al.

(10) Patent No.: US 9,467,227 B2
(45) Date of Patent: Oct. 11, 2016

(54) METHOD AND SYSTEM FOR AN OPTICAL CONNECTION SERVICE INTERFACE

(71) Applicant: Luxtera, Inc., Carlsbad, CA (US)

(72) Inventors: Gianlorenzo Masini, Carlsbad, CA (US); Joseph Balardeta, Encinitas, CA (US); Scott Denton, Carlsbad, CA (US)

( * ) Notice: Subject to any disclaimer, the term of this patent is extended or adjusted under 35 U.S.C. 154(b) by 33 days.

(21) Appl. No.: 14/657,907

(22) Filed: Mar. 13, 2015

(65) Prior Publication Data

US 2016/0182151 A1 Jun. 23, 2016

Related U.S. Application Data (60) Provisional application No. 61/967,254, filed on Mar. 13, 2014.

(51) Int. Cl.
H04B 10/00 (2013.01)
H04B 10/25 (2013.01)
H04B 10/40 (2013.01)

(52) U.S. Cl.
CPC .......... H04B 10/2503 (2013.01); H04B 10/40 (2013.01)

(58) Field of Classification Search
USPC .................................. 398/140–141, 135–139
See application file for complete search history.

(56) References Cited

U.S. PATENT DOCUMENTS

| | | | | |
|---|---|---|---|---|
| 5,184,241 A * | 2/1993 | Schwemmer | .......... | H04B 11/00 367/904 |
| 6,072,614 A * | 6/2000 | Roberts | ................ | H04B 10/071 359/334 |
| 6,295,272 B1 * | 9/2001 | Feldman | ............. | H04L 25/4908 370/203 |
| 7,184,671 B2 * | 2/2007 | Wang | ................... | H04B 10/572 398/195 |
| 7,324,760 B2 * | 1/2008 | Gronbach | ............ | H04B 10/505 359/240 |
| 7,725,043 B2 * | 5/2010 | Ng | ........................ | H04B 10/504 372/20 |
| 7,865,079 B2 * | 1/2011 | Duggan | ............. | H04Q 11/0005 398/185 |
| 8,532,499 B2 * | 9/2013 | Caton | ................ | H04B 10/5051 359/245 |
| 8,571,417 B2 * | 10/2013 | Wu | ......................... | H04J 14/02 398/185 |
| 2002/0196503 A1 * | 12/2002 | DeCusatis | ........ | H04B 10/25137 398/147 |
| 2004/0033079 A1 * | 2/2004 | Sheth | .................... | H04B 10/801 398/135 |
| 2004/0161243 A1 * | 8/2004 | Ooi | ...................... | H04B 10/2507 398/152 |
| 2005/0058460 A1 * | 3/2005 | Wang | .................... | H04B 10/572 398/195 |
| 2005/0191060 A1 * | 9/2005 | Gronbach | ............ | H04B 10/505 398/183 |
| 2006/0078339 A1 * | 4/2006 | Ng | ........................ | H04B 10/504 398/195 |

(Continued)

*Primary Examiner* — Agustin Bello
(74) *Attorney, Agent, or Firm* — McAndrews Held & Malloy (57) ABSTRACT

Methods and systems for an optical connection service interface may include, in an optical data link comprising an optical fiber, a local control system, first and second transceivers at ends of the optical fiber, generating a control signal for the local control system at frequencies <10 Hz and communicating, utilizing the optical fiber, an optical data signal at frequencies >10 kHz and an optical service signal for an Optical Connection Service interface (OCSi) at intermediate frequencies between 10 Hz and 10 kHz. An optical signal may be modulated at the intermediate frequencies for the OCSi, and may be modulated and communicated to the second transceiver. The communicated modulated signal and the optical data signal may be detected utilizing a photodetector in the second transceiver. The detected optical signal may be demodulated, and an optical power of the optical data signal may be configured based on the demodulated signal.

20 Claims, 6 Drawing Sheets

(56) References Cited

U.S. PATENT DOCUMENTS

| | | | | |
|---|---|---|---|---|
| 2006/0127103 A1* | 6/2006 | Mazurczyk | H04B 10/505 | 398/188 |
| 2006/0263095 A1* | 11/2006 | Bai | H04B 10/5051 | 398/183 |
| 2006/0291870 A1* | 12/2006 | Wan | H04B 10/505 | 398/183 |
| 2008/0031626 A1* | 2/2008 | Welch | G02B 6/12004 | 398/79 |
| 2008/0199186 A1* | 8/2008 | Domagala | H04B 10/66 | 398/155 |
| 2008/0232813 A1* | 9/2008 | Yutani | H04B 10/2537 | 398/135 |
| 2009/0003843 A1* | 1/2009 | Oomori | H01S 5/0622 | 398/197 |
| 2009/0257757 A1* | 10/2009 | Wan | H04B 10/504 | 398/202 |
| 2010/0046949 A1* | 2/2010 | Bainbridge | H04B 10/506 | 398/79 |
| 2010/0098422 A1* | 4/2010 | Takeda | H04B 10/0777 | 398/79 |
| 2010/0166424 A1* | 7/2010 | Nagarajan | B82Y 20/00 | 398/79 |
| 2012/0087655 A1* | 4/2012 | Neilson | G02B 5/20 | 398/34 |
| 2012/0155882 A1* | 6/2012 | Sheth | H04B 10/801 | 398/98 |
| 2012/0263463 A1* | 10/2012 | Toyomaki | H04B 10/0775 | 398/48 |
| 2012/0288284 A1* | 11/2012 | Yoshida | H04B 10/5053 | 398/186 |
| 2013/0101296 A1* | 4/2013 | Nishimoto | H04B 10/588 | 398/79 |
| 2013/0279913 A1* | 10/2013 | Akiyama | H04B 10/5053 | 398/65 |
| 2014/0050480 A1* | 2/2014 | Wu | H04J 14/02 | 398/79 |
| 2014/0064734 A1* | 3/2014 | Witzens | H04B 10/64 | 398/79 |
| 2014/0233963 A1* | 8/2014 | Le Taillandier De Gabory | H04B 10/516 | 398/183 |
| 2014/0286650 A1* | 9/2014 | Ogiwara | H04B 10/6164 | 398/208 |

* cited by examiner

METHOD AND SYSTEM FOR AN OPTICAL CONNECTION SERVICE INTERFACE

CROSS-REFERENCE TO RELATED APPLICATIONS/INCORPORATION BY REFERENCE

This application claims priority to and the benefit of U.S. Provisional Application No. 61/967,254 filed on Mar. 13, 2014, which is hereby incorporated herein by reference in its entirety.

FIELD

Certain embodiments of the disclosure relate to semiconductor photonics. More specifically, certain embodiments of the disclosure relate to a method and system for an optical connection service interface.

BACKGROUND

As data networks scale to meet ever-increasing bandwidth requirements, the shortcomings of copper data channels are becoming apparent. Signal attenuation and crosstalk due to radiated electromagnetic energy are the main impediments encountered by designers of such systems. They can be mitigated to some extent with equalization, coding, and shielding, but these techniques require considerable power, complexity, and cable bulk penalties while offering only modest improvements in reach and very limited scalability. Free of such channel limitations, optical communication has been recognized as the successor to copper links.

Further limitations and disadvantages of conventional and traditional approaches will become apparent to one of skill in the art, through comparison of such systems with the present disclosure as set forth in the remainder of the present application with reference to the drawings.

BRIEF SUMMARY

A system and/or method for an optical connection service interface, substantially as shown in and/or described in connection with at least one of the figures, as set forth more completely in the claims.

Various advantages, aspects and novel features of the present disclosure, as well as details of an illustrated embodiment thereof, will be more fully understood from the following description and drawings.

DETAILED DESCRIPTION

Certain aspects of the disclosure may be found in a method and system for an optical connection service interface. Exemplary aspects of the disclosure may comprise, in an optical data link comprising an optical fiber, a local control system, a first transceiver at a first end of the optical fiber, and a second transceiver at a second end of the optical fiber: communicating an optical data signal at frequencies greater than 10 kHz utilizing the optical fiber; generating a control signal for the local control system at frequencies less than 10 Hz utilizing the optical fiber; and communicating an optical service signal for an Optical Connection Service interface (OCSi) at intermediate frequencies between 10 Hz and 10 kHz utilizing the optical fiber. An optical signal may be modulated at said intermediate frequencies for the OCSi. The optical signal may be modulated by superimposing a modulation signal onto the biasing conditions for a laser in the first transceiver and the modulated signal may be communicated to the second transceiver utilizing the optical fiber. The communicated modulated signal and the optical data signal may be detected utilizing a photodetector in the second transceiver. The detected optical signal may be demodulated, and an optical power of the optical data signal may be configured based on the demodulated signal. The optical signal may be modulated utilizing a modulator in the first transceiver, and the modulated optical signal may be communicated to the second transceiver utilizing the optical fiber. The modulated optical signal and the optical data signal from the first transceiver may be detected utilizing a photodetector in the second transceiver. The detected optical signal may be demodulated, and an optical power of the optical data signal may be configured based on the demodulated signal. Optical service signals may be communicated in both directions in the optical fiber. An average value of the control signal may be configured by configuring an encoding density of the OCSi signal.

Figure 1A:
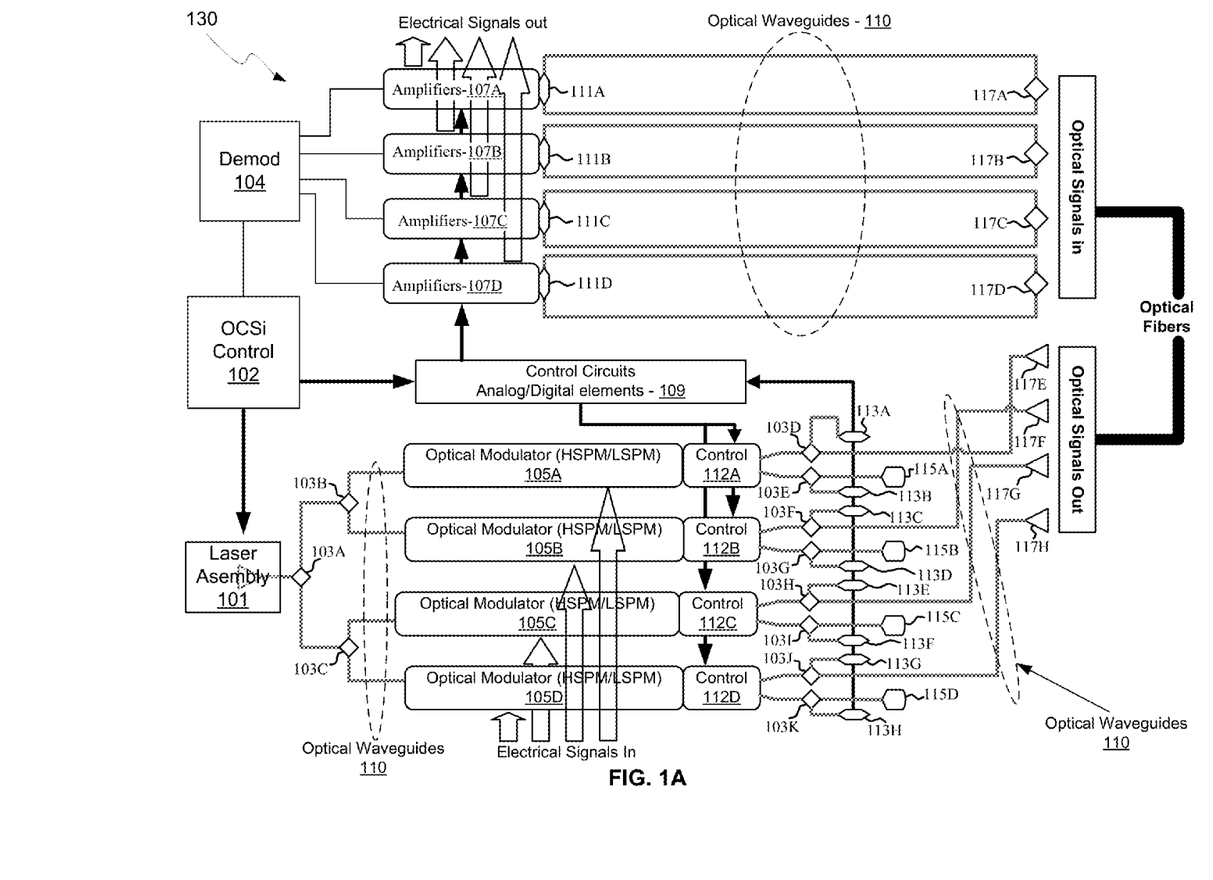
FIG. 1A is a block diagram of a photonically-enabled integrated circuit with an Optical Connection Service interface, in accordance with an example embodiment of the disclosure.

FIG. 1A is a block diagram of a photonically-enabled integrated circuit with an Optical Connection Service interface, in accordance with an example embodiment of the disclosure. Referring to FIG. 1A, there is shown optoelectronic devices on a photonically-enabled integrated circuit 130 comprising optical modulators 105A-105D, photodiodes 111A-111D, monitor photodiodes 113A-113I, and optical devices comprising couplers 103A-103K, optical terminations 115A-115D, and grating couplers 117A-117H. There are also shown electrical devices and circuits comprising an Optical Connection Service interface (OCSi) control module 102, a demodulator 104, amplifiers 107A-107D, analog and digital control circuits 109, and control sections 112A-112D. The amplifiers 107A-107D may comprise transimpedance and limiting amplifiers (TIA/LAs), for example. In an example scenario, the photonically-enabled integrated circuit 130 comprises a CMOS photonics die.

Optical signals may be communicated between optical and optoelectronic devices via optical waveguides 110 fabricated in the photonically-enabled integrated circuit 130. Single-mode or multi-mode waveguides may be used in photonic integrated circuits. Single-mode operation enables direct connection to optical signal processing and networking elements. The term "single-mode" may be used for waveguides that support a single mode for each of the two polarizations, transverse-electric (TE) and transverse-magnetic (TM), or for waveguides that are truly single mode and only support one mode whose polarization is TE, which comprises an electric field parallel to the substrate supporting the waveguides. Two typical waveguide cross-sections that are utilized are strip waveguides and rib waveguides. Strip waveguides typically comprise a rectangular cross-section, whereas rib waveguides comprise a rib section on top of a waveguide slab. Of course, other waveguide cross section types are also contemplated and within the scope of the disclosure.

The optical modulators 105A-105D comprise Mach-Zehnder or ring modulators, for example, and enable the modulation of the continuous-wave (CW) laser input signal. The optical modulators 105A-105D may comprise high-speed and low-speed phase modulation sections and are controlled by the control sections 112A-112D. The high-speed phase modulation section of the optical modulators 105A-105D may modulate a CW light source signal with a data signal. The low-speed phase modulation section of the optical modulators 105A-105D may compensate for slowly varying phase factors such as those induced by mismatch between the waveguides, waveguide temperature, or waveguide stress and is referred to as the passive phase, or the passive biasing of the MZI.

In an example scenario, the low-speed phase modulation section of the optical modulators 105A-105D may be controlled by the OCSi module 102. An OCSi may comprise a low speed (~kb/s) service interface intended to enable communication between the two ends of an active optical cable (AOC) and/or a high speed optical link using one or more transceivers such as are integrated in the photonically-enabled integrated circuit 130. The demodulator 104 may receive signals from the photodiodes 111A-111D and demodulate signals that were modulated in the 10-10 kHz frequency range. The demodulated signals may be provided to the OCSi module 102 for OCSi commands, for example. In an example scenario, the OCSi module 102 may modulate optical signals for the OCSi by superimposing a modulation signal onto the biasing conditions for one or more lasers in the laser assembly 101.

The outputs of the modulators 105A-105D may be optically coupled via the waveguides 110 to the grating couplers 117E-117H. The couplers 103C-103J may comprise four-port optical couplers, for example, and may be utilized to sample or split the optical signals generated by the optical modulators 105A-105D, with the sampled signals being measured by the monitor photodiodes 113A-113H. The unused branches of the directional couplers 103D-103J may be terminated by optical terminations 115A-115D to avoid back reflections of unwanted signals.

The grating couplers 117A-117H comprise optical gratings that enable coupling of light into and out of the photonically-enabled integrated circuit 130. The grating couplers 117A-117D may be utilized to couple light received from optical fibers into the photonically-enabled integrated circuit 130, and the grating couplers 117E-117H may be utilized to couple light from the photonically-enabled integrated circuit 130 into optical fibers. The grating couplers 117A-117H may comprise single polarization grating couplers (SPGC), polarization splitting grating couplers (PSGC), demultiplexing grating couplers (DMGC), and/or bi-wavelength polarization-multiplexing grating couplers (PMGC). Example PSGC and PMGC structures are described in application Ser. No. 62/122,718 filed on Oct. 28, 2014, which is incorporated herein by reference in its entirety. In instances where a PSGC or a PMGC is utilized, two input, or output, waveguides may be utilized. In instances where a DMGC is utilized, four input, or output, waveguides may be utilized.

The optical fibers may be epoxied, for example, to the CMOS chip, and may be aligned at an angle from normal to the surface of the photonically-enabled integrated circuit 130 to optimize coupling efficiency. In an example embodiment, the optical fibers may comprise single-mode fiber (SMF) and/or polarization-maintaining fiber (PMF).

In an example embodiment, optical signals may be generated by the laser assembly 101, also sometimes referred to as a LaMP, mounted to the photonically-enabled integrated circuit 130. The laser assembly 101 may comprise one or more semiconductor lasers with optical elements for focusing and directing optical signals, and may generate different wavelengths for multi-wavelength operation of the photonically-enabled integrated circuit 130, or a single wavelength. Accordingly, the grating couplers 103A and 103B may be configured for a desired wavelength. In another example scenario, each CW laser In 101A and 101B may comprise multiple wavelength outputs and the grating couplers 103A and 103B may be configured to receive multiple wavelengths.

The photodiodes 111A-111D may convert optical signals received from the grating couplers 117A-117D into electrical signals that are communicated to the amplifiers 107A-107D for processing. In another embodiment of the disclosure, the photodiodes 111A-111D may comprise high-speed heterojunction phototransistors, for example, and may comprise germanium (Ge) in the collector and base regions for absorption in the 1.3-1.6 µm optical wavelength range, and may be integrated on a CMOS silicon-on-insulator (SOI) wafer.

The analog and digital control circuits 109 may control gain levels or other parameters in the operation of the amplifiers 107A-107D, which may then communicate electrical signals off the photonically-enabled integrated circuit 130. In addition, the analog and digital control circuits 109 may comprise a local control system that may maintain the quadrature biasing of the MZI modulators on the different channels, detect and report LOS (loss of signal) events both on the optical as well as on the electrical ends of the link, optimize the configuration of adaptive equalization/emphasis circuitry, enable/disable on-chip re-timers, and collect and reports status information such as temperature/signal levels, and re-timer locking status.

The control sections 112A-112D comprise electronic circuitry that enable modulation of the CW laser signal received from the splitters 103A-103C. The optical modulators 105A-105D may require high-speed electrical signals to modulate the refractive index in respective branches of a Mach-Zehnder interferometer (MZI), for example. In an example embodiment, the control sections 112A-112D may include sink and/or source driver electronics that may enable a bidirectional link utilizing a single laser.

In operation, the photonically-enabled integrated circuit 130 may be operable to transmit and/or receive and process optical signals. Optical signals may be received from optical fibers by the grating couplers 117A-117D and converted to electrical signals by the photodetectors 111A-111D. The electrical signals may be amplified by transimpedance amplifiers in the amplifiers 107A-107D, for example, and subsequently communicated to other electronic circuitry (not shown) in the photonically-enabled integrated circuit 130.

An integrated transceiver may comprise at least three optical interfaces, including a transmitter input port to interface to the CW light source, labeled as CW Laser In 101A; a transmitter output port to interface to the fiber carrying the optical signal, labeled Optical Signals Out; and a receiver input port to interface to the fiber carrying the optical signal, labeled Optical Signals In.

Integrated photonics platforms allow the full functionality of an optical transceiver to be integrated on a single chip. An optical transceiver chip contains optoelectronic circuits that create and process the optical/electrical signals on the transmitter (Tx) and the receiver (Rx) sides, as well as optical interfaces that couple the optical signals to and from a fiber. The signal processing functionality may include modulating the optical carrier, detecting the optical signal, splitting or combining data streams, and multiplexing or demultiplexing data on carriers with different wavelengths.

In an example embodiment of the disclosure, the OCSi module 102 may be operable to provide control for an OCSi, which may be utilized to optimize system parameters, such as laser power and equalization, based on mutual knowledge of transceiver performance by the two ends of the optical link. The OCSi may provide status and environmental information on the modulator module useful to optimize the performance of the high-speed link. The OCSi may also provide adaptive optimization of system parameters based on mutual knowledge of temperature of the two ends of the optical link and remote troubleshooting of hard-to-access or soldered transceiver from the accessible end of the link. A local control system in the The OCSi is described further with respect to FIGS. 2-4, for example.

Figure 1B:
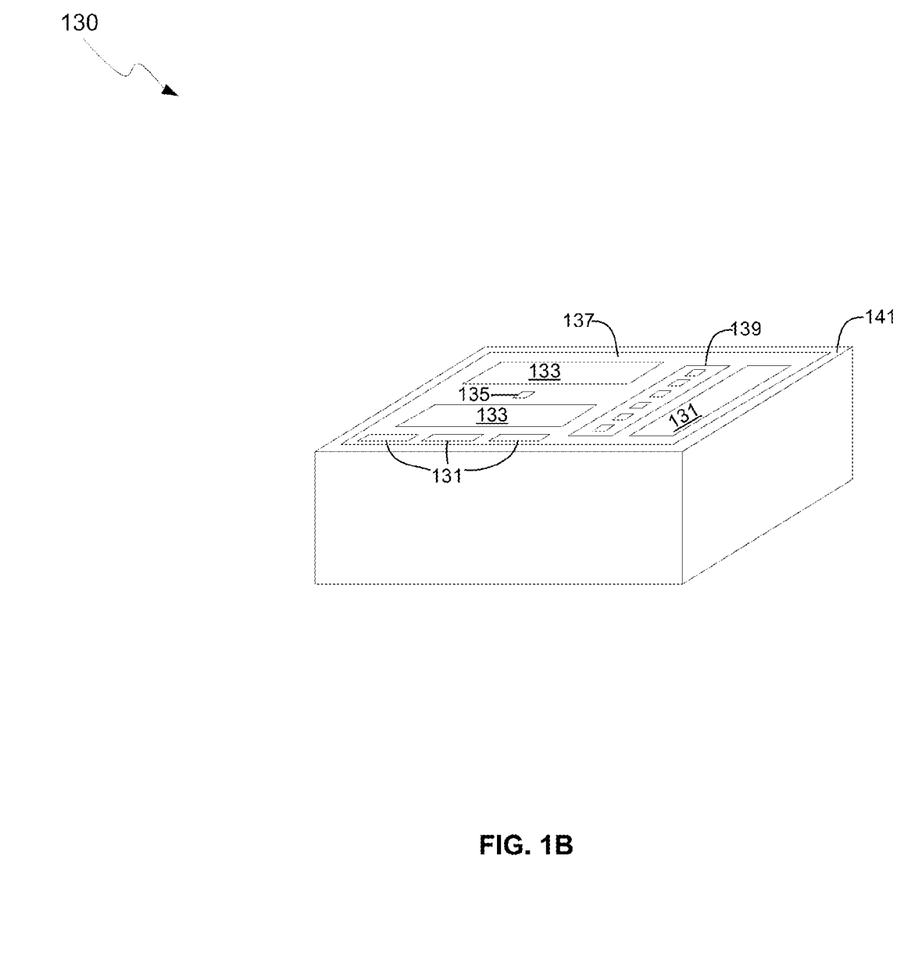
FIG. 1B is a diagram illustrating an exemplary photonically-enabled integrated circuit with Optical Connection Service interface, in accordance with an exemplary embodiment of the disclosure.

FIG. 1B is a diagram illustrating an exemplary photonically-enabled integrated circuit with Optical Connection Service interface, in accordance with an exemplary embodiment of the disclosure. Referring to FIG. 1B, there is shown the photonically-enabled integrated circuit 130 comprising electronic devices/circuits 131, optical and optoelectronic devices 133, light source interfaces 135A and 135B, a chip front surface 137, an optical fiber interface 139, and a CMOS guard ring 141.

The light source interfaces 135A/135B and the optical fiber interface 139 comprise grating couplers, for example, that enable coupling of light signals via the CMOS chip surface 137, as opposed to the edges of the chip as with conventional edge-emitting/receiving devices. Coupling light signals via the chip surface 137 enables the use of the CMOS guard ring 141 which protects the chip mechanically and prevents the entry of contaminants via the chip edge.

The electronic devices/circuits 131 comprise circuitry such as the amplifiers 107A-107D and the analog and digital control circuits 109 described with respect to FIG. 1A, for example. The optical and optoelectronic devices 133 comprise devices such as the couplers 103A-103K, optical terminations 115A-115D, grating couplers 117A-117H, optical modulators 105A-105D, high-speed heterojunction photodiodes 111A-111D, and monitor photodiodes 113A-113I.

In an example scenario, the electronic devices/circuits 131 comprise an OCSi module that may control the optical interface in an active optical cable or other high-speed optical link in which the photonically-enabled integrated circuit 130 comprises one end.

Figure 1C:
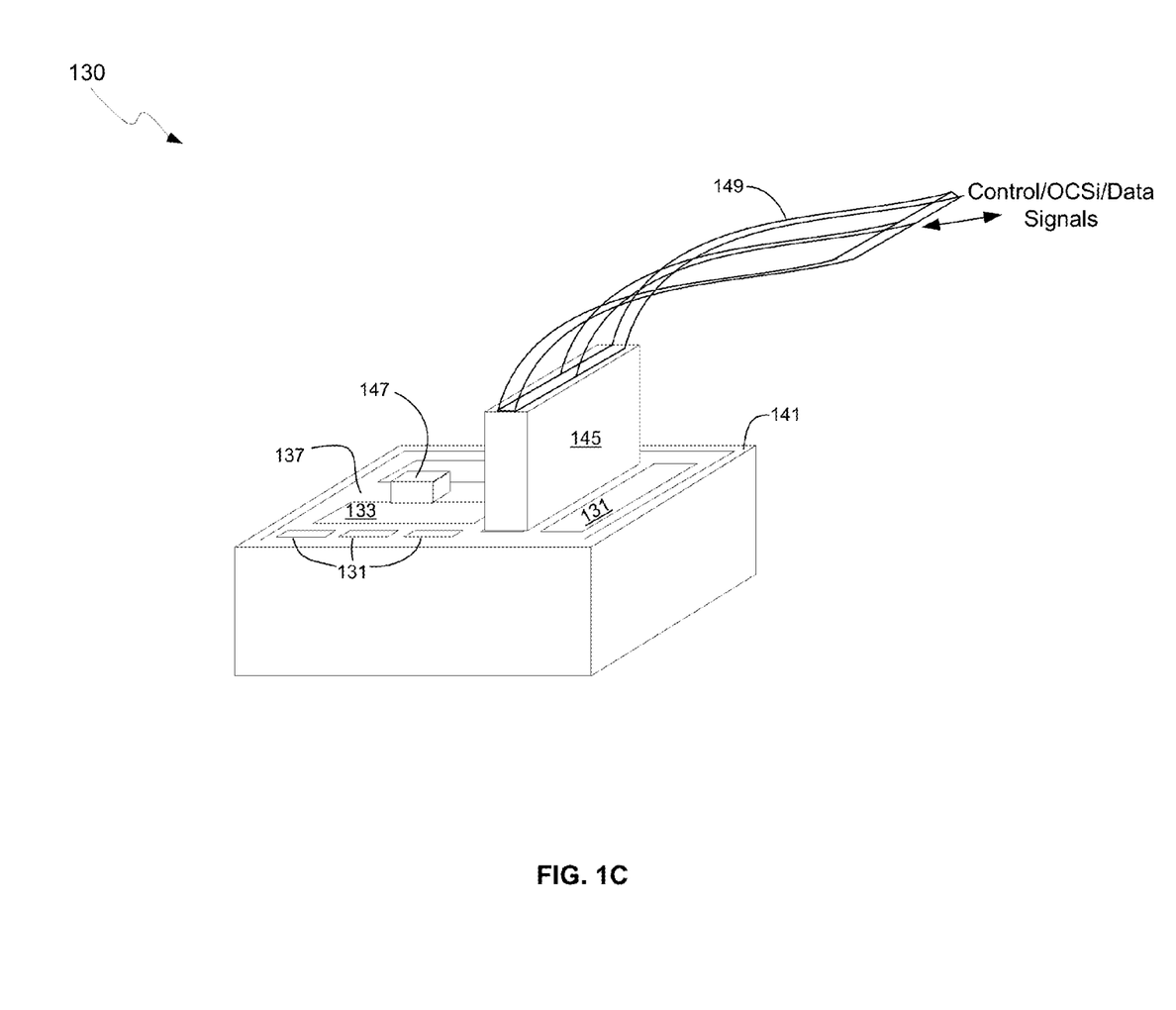
FIG. 1C is a diagram illustrating a photonically-enabled integrated circuit coupled to an optical fiber cable, in accordance with an example embodiment of the disclosure.

FIG. 1C is a diagram illustrating a photonically-enabled integrated circuit coupled to an optical fiber cable, in accordance with an example embodiment of the disclosure. Referring to FIG. 1C, there is shown the photonically-enabled integrated circuit 130 comprising the chip surface 137, and the CMOS guard ring 141. There is also shown a fiber-to-chip coupler 145, an optical fiber cable 149, and an optical source assemblies 147A and 147B.

The photonically-enabled integrated circuit 130 comprising the electronic devices/circuits 131, the optical and optoelectronic devices 133, the light source interface 135, the chip surface 137, and the CMOS guard ring 141 may be as described with respect to FIG. 1B, for example.

In an example embodiment, the optical fiber cable may be affixed, via epoxy for example, to the CMOS chip surface 137. The fiber chip coupler 145 enables the physical coupling of the optical fiber cable 149 to the photonically-enabled integrated circuit 130 and may be configured to place the optical fibers in the optical fiber cable 149 at an angle from normal to the chip surface 137 for optimum coupling efficiency into the grating coupler. The angle may be defined by the grating coupler design and wavelength of light to be coupled, for example.

In an example scenario, the photonically-enabled integrated circuit 130 may comprise a low-speed service interface for the optical link over the optical fiber cable 149. The OCSi may operate in a frequency range between ~10 HZ and ~10 kHz, which is below the optical interface frequency and above the control system frequency range. The control/OCSi/data signals may be communicated via the optical fiber cable 149.

Figure 2:
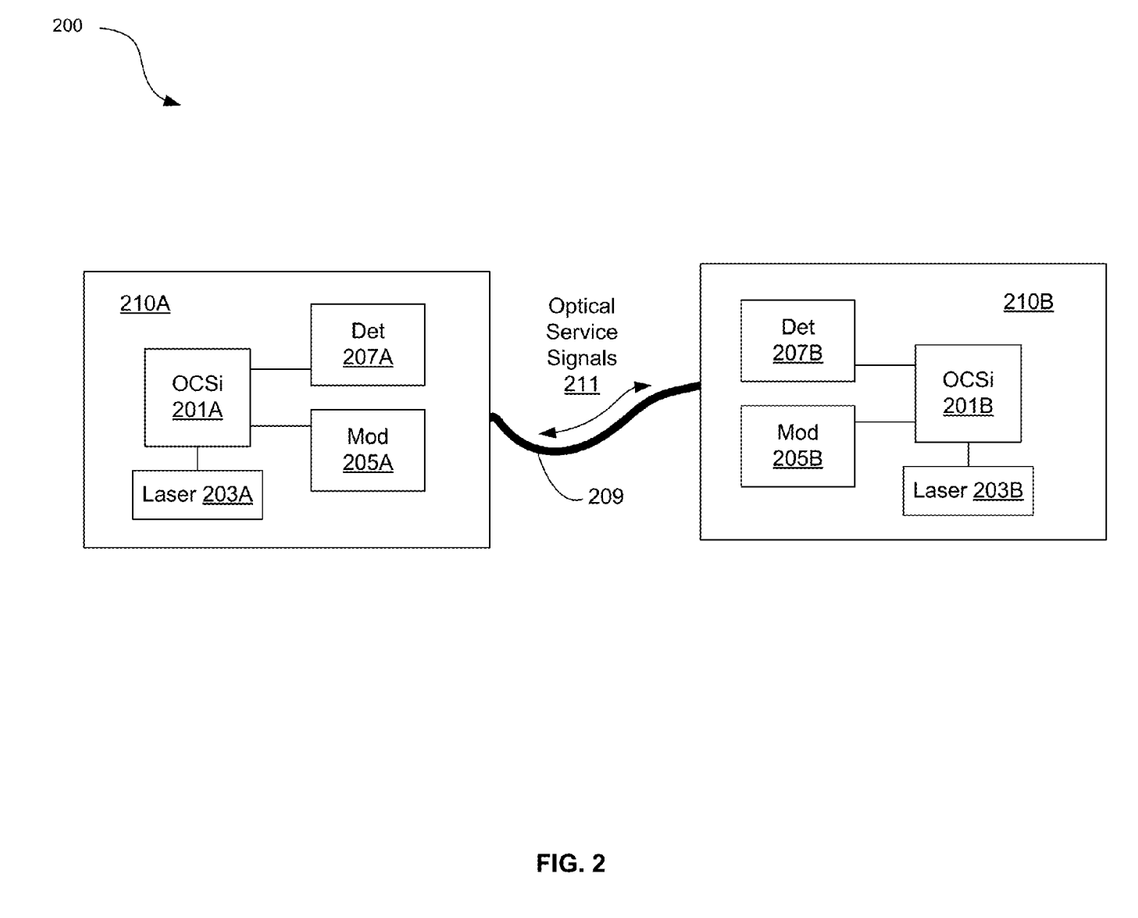
FIG. 2 illustrates an optical link with Optical Connection Service interface, in accordance with an example embodiment of the disclosure.

FIG. 2 illustrates an optical link with Optical Connection Service interface, in accordance with an example embodiment of the disclosure. FIG. 2 may share any and all aspects of FIGS. 1A-1C, for example. Referring to FIG. 2, there is shown an optical link 200 comprising transceivers 210A and 210B coupled by optical fiber 209. Each transceiver 201A/201B may comprise an OCSi module 201A/201B, a laser source 203A/203B, modulators 205A/205B, and detectors 207A/207B.

Figure 3:
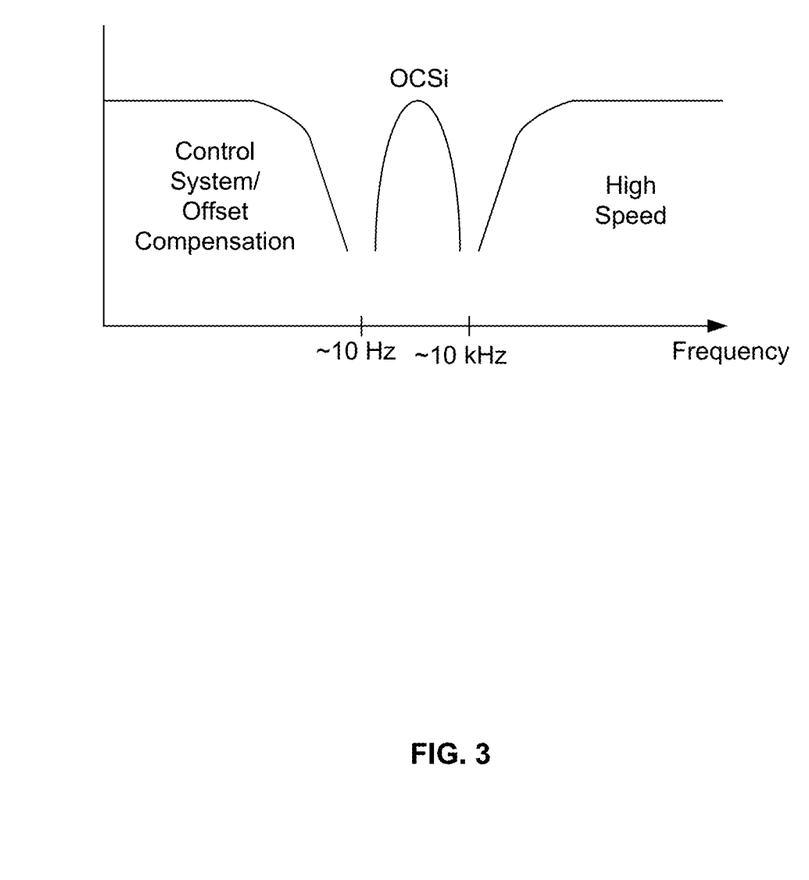
FIG. 3 illustrates the operational frequency range of the Optical Connection Service interface, in accordance with an example embodiment of the disclosure.

The OCSi may use the same physical medium, MAC and PHYs of the high-speed link. Multiplexing with high speed data may be done in the frequency domain by selecting a band below the lower band occupation of the high-speed optical signal and above the control system loops bandwidth, as illustrated in FIG. 3.

The OCSi modules 201A and 201B may comprise suitable logic, circuits, and/or code from configuring an OCSi link between the transceivers 210A and 201B at frequencies below that of the high frequency optical signals and above the control system frequencies. Accordingly, the OCSi modules 201A and 201B may comprise controller circuitry for communicating signals to the lasers 203A and 203B to modulate the output signal at a frequency range specifically for OCSi and not detected by the high frequency circuitry. Similarly, the OCSi modules 201A and 201B may provide low frequency signals to the modulators 205A and 205B for transmission of individually configurable multiple OCSi signals.

The output signals from the detectors 207A and 207B, while also used to receive the high frequency optical signals, may also be monitored for lower frequency OCSi signals to be used by the OCSi modules 201A and 201B to configure the desired component or components of the transceivers 210A and 210B.

In an example scenario of the OCSi protocol, modulation may be performed by directly applying a low frequency modulating signal to the lasers 203A/203B through their driver circuitry. In this example, all channels sharing the same laser source would carry the same OCSi signal.

In another example scenario, the signal may be applied to the low speed phase modulators (PINPM) and can be, therefore, different for each channel. In both examples, the signal may be encoded in such a way to minimize the disturbance on the high-speed links. This may be achieved by limiting the bandwidth of the OCSi signaling such that it is below the low frequency cutoff of the receiver. Furthermore, the amplitude of the OCSi signaling may be limited to a few least significant bits (LSBs) of a laser biasing digital-to-analog converter (DAC), for example. Finally, encoding (8B/10B) may be utilized to generate the desired trends (stable, increasing, decreasing) in the laser and MZI control signals as required by the dynamic operating conditions.

On the receiver side, the detection of the modulation can use the receiving photodetector signal, IPHOTO, which sets a limit to the maximum data rate to half of the IPHOTO sampling rate. When laser modulation is used on the TX side, the IPHOTO of the different channels may be utilized to improve the signal to noise ratio.

In an example scenario, clock recovery may be implemented in firmware or through a state machine. A "locked" state may be saved in a memory map register in the OCSi module 201A/201B for external use. In an example scenario, the OCSi module 201A/20B may use a binary NRZ amplitude modulation.

In terms of encoding, the basic unit of the OCSi signal is the byte (8 bits), where each byte may be transcoded using the 8B/10B coding. The choice of one of the four possible options per symbol depends on the input from the laser/MZI control system: symbols with higher 1/0 densities may be utilized if the control signal, in average value, magnitude, or power level, is trending low/high. Otherwise the system may pick the best symbol sequence to keep the average value of the control signal. For example, in the presence of a request from the control system to increase the control signal, the encoding by the OCSi module 201A/201B may start using symbols with higher 1 density, thus bringing the average value toward the required level. Once the desired level is reached, the system will start using again symbols with zero average. This may help stabilize the bias conditions of the lasers and/or modulators in the photonics transceivers.

FIG. 3 illustrates the operational frequency range of the Optical Connection Service interface, in accordance with an example embodiment of the disclosure. Referring to FIG. 3, there is shown a frequency plot showing range of operation of the optical link 200. Below ~10 Hz is the control system and offset compensation. The local control system may configure the bias conditions for the light source, for example. As stated previously, the local control system may maintain the quadrature biasing of the MZI modulators on the different channels, detect and report LOS (loss of signal) events both on the optical as well as on the electrical ends of the link, optimize the configuration of adaptive equalization/emphasis circuitry, enable/disable on-chip re-timers, and collect and reports status information such as temperature/signal levels, and re-timer locking status.

The high speed optical data signal may operate in the ~10 kHz and higher frequencies, operating up to the switching speed of the system, in the tens of GHz range, for example. The low frequency corner of the high speed signal may be well above the OCSi frequency range of ~10 Hz to ~10 kHz, as illustrated in FIG. 3. Therefore, any lower frequency OCSi signals applied to the optical signals do not degrade the performance of the high frequency system.

Figure 4:
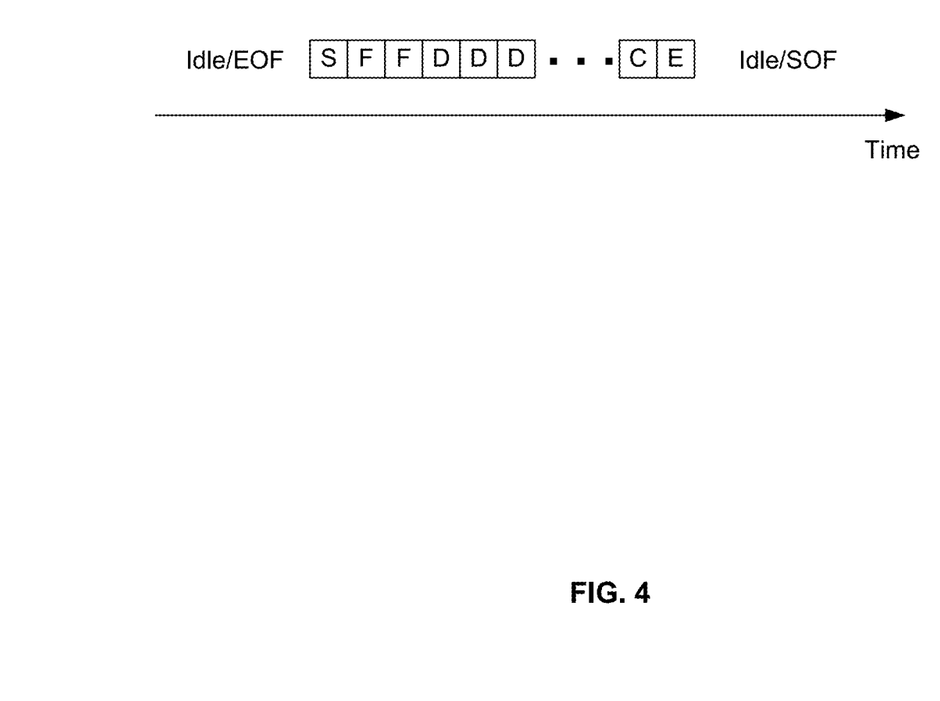
FIG. 4. Illustrates an example frame structure for an Optical Connection Service interface, in accordance with an example embodiment of the disclosure.

FIG. 4. Illustrates an example frame structure for an Optical Connection Service interface, in accordance with an example embodiment of the disclosure. The optical data link 200 may utilize two different protocols, one "continuous" (OCSi-c) and another "on-demand" (OCSi-d). Implementation depends on the application specifics.

OCSi-c may utilize a bi-directional full duplex protocol. Transmission may be continuous (to allow easy clock recovery lock): when no data needs to be transmitted or Tx is waiting for Acknowledge, idle symbols may be generated. Data may then be transmitted in frames starting and ending with specific delimiters. Frames can carry up to 251 symbols of data, for example. Each frame may have the following structure (no addressing required), SOF-FL-FT-D-D-D . . . D-CS-EOF, as illustrated in FIG. 4.

Where SOF is the start of frame symbol, FL is the number of data bytes in the frame, FT is the type of frame (command/data), D are the payload symbols, CS is a checksum byte (1 or 2), and EOF is the end of frame symbol. In an example scenario, the transmitting side waits for reception of Acknowledge or Retransmit before transmitting the next frame.

The on-demand protocol, OCSi-d, may also utilize a bi-directional full duplex protocol. Transmission may be initiated by either of the two sides with a preamble that is used to test the link and signal transmission capability. The other end of the link answers the preamble and may start a handshake phase to define basic communication parameters (data rate, channel used, for example). A temporary request to increase LaMP bias to allow for a cleaner transmission may also be part of the handshake protocol. This may have a limited impact on LaMP lifetime because of the very low duty cycle of communications in OCSi-d. Once the link is established, data/commands may be transmitted in bursts. Each burst may have the following structure: SOF-FL-FT-D-D-D . . . D-CS-EOF with same meaning as for OCSi-c. As with OCSi-c, transmission of the next burst will wait until an Acknowledge or a Retransmit is received.

In an example scenario, A number of key symbols may be defined and reserved in the OCSi alphabet (10B words) to identify the following functions:

Start of frame (SOF)
End of frame (EOF)
Idle
Acknowledge
Retransmit

The OCSi may comprise a physical point-to-point protocol. No network routing or addressing is required. For transport, validation of data transfer may be accomplished through the checksum associated with each frame. OCSi may utilize a resend protocol based on the reception of the Retransmit in response to a frame.

A 256 byte memory map in the OCSi module 201A may be used to store one or more received frames (depending on the length) for batch response. The pipe can be programmatically cleared from the remote side using a command.

If the memory map is full, the Rx will keep dropping the received frames and sending Retransmit as a response to incoming frames until the buffer has space again. This occurs unless a buffer clear command is received, which will cause all currently executing operations to abort and clean the buffer for accepting new requests.

For the application layer, OCSi may define a set of commands to request/exchange basic information between the two link ends. Commands may be 7 bits long and fit into the FT element in the frame. The MSB of the FT is 0 when the command is issued and 1 for the returned data (so that issuer can couple the response to its request). Command examples include:

Status/ID information request
Remote register read
Remote register write
Clear request pipe on remote side End of transmission (used in OCSi-d to return to normal LaMP biasing)

In an example embodiment, a method and system are disclosed for an optical connection service interface. In this regard, aspects of the disclosure may comprise an optical data link comprising an optical fiber, a local control system, a first transceiver at a first end of the optical fiber, and a second transceiver at a second end of the optical fiber, the optical data link being operable to: communicate an optical data signal at frequencies greater than 10 kHz utilizing the optical fiber, generate a control signal for the local control system at frequencies less than 10 Hz utilizing the optical fiber, and communicate an optical service signal for an Optical Connection Service interface (OCSi) at intermediate frequencies between 10 Hz and 10 kHz utilizing the optical fiber.

An optical signal may be modulated at the intermediate frequencies for the OCSi. The optical signal may be modulated by superimposing a modulation signal onto biasing conditions for a laser in the first transceiver and the modulated signal may be communicated to the second transceiver utilizing the optical fiber. The communicated modulated signal and the optical data signal may be detected utilizing a photodetector in the second transceiver. The detected optical signal may be demodulated and an optical power of the optical data signal may be configured based on the demodulated signal. The optical signal may be modulated utilizing a modulator in the first transceiver, and the modulated optical signal may be communicated to the second transceiver utilizing the optical fiber.

The modulated optical signal from the first transceiver may be detected utilizing a photodetector in the second transceiver. The detected optical signal may be demodulated, and an optical power of the optical data signal may be configured based on the demodulated signal. Optical service signals may be communicated in both directions in the optical fiber. An average value of the control signal may be configured by configuring an encoding density of the OCSi signal.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiments disclosed, but that the present disclosure will include all embodiments falling within the scope of the appended claims.

What is claimed is:

1. A method for communication, the method comprising:
in an optical data link comprising an optical fiber, a local control system, a first transceiver at a first end of the optical fiber, and a second transceiver at a second end of the optical fiber:
communicating an optical data signal at frequencies greater than 10 kHz utilizing the optical fiber;
generating a control signal for the local control system at frequencies less than 10 Hz utilizing the optical fiber; and
communicating an optical service signal for an Optical Connection Service interface (OCSi) at intermediate frequencies between 10 Hz and 10 kHz utilizing the optical fiber.

2. The method according to claim 1, comprising modulating an optical signal at the intermediate frequencies for the OCSi.

3. The method according to claim 2, comprising modulating the optical signal by superimposing a modulation signal onto biasing conditions for a laser in the first transceiver and communicating the modulated signal to the second transceiver utilizing the optical fiber.

4. The method according to claim 3, comprising detecting the communicated modulated signal and the optical data signal utilizing a photodetector in the second transceiver.

5. The method according to claim 4, comprising demodulating the detected optical signal, and configuring an optical power of the optical data signal based on the demodulated signal.

6. The method according to claim 2, comprising modulating the optical signal utilizing a modulator in the first transceiver and communicating the modulated optical signal to the second transceiver utilizing the optical fiber.

7. The method according to claim 6, comprising detecting the modulated optical signal and the optical data signal from the first transceiver utilizing a photodetector in the second transceiver.

8. The method according to claim 7, comprising demodulating the detected optical signal, and configuring optical power of the optical data signal based on the demodulated signal.

9. The method according to claim 1, wherein optical service signals are communicated in both directions in said optical fiber.

10. The method according to claim 1, comprising configuring an average power value of the control signal by configuring an encoding density of the OCSi signal.

11. A system for communication, the system comprising:
an optical data link comprising an optical fiber, a local control system, a first transceiver at a first end of the optical fiber, and a second transceiver at a second end of the optical fiber, the optical data link being operable to:
communicate an optical data signal at frequencies greater than 10 kHz utilizing the optical fiber;

generate a control signal for the local control system at frequencies less than 10 Hz utilizing the optical fiber; and communicate an optical service signal for an Optical Connection Service interface (OCSi) at intermediate frequencies between 10 Hz and 10 kHz utilizing the optical fiber.

12. The system according to claim 11, wherein the optical data link is operable to modulate an optical signal at the intermediate frequencies for the OCSi.

13. The system according to claim 12, wherein the optical data link is operable to modulate the optical signal by superimposing a modulation signal onto biasing conditions for a laser in the first transceiver and communicate the modulated signal to the second transceiver utilizing the optical fiber.

14. The system according to claim 13, wherein the optical data link is operable to detect the communicated modulated signal and the optical data signal utilizing a photodetector in the second transceiver.

15. The system according to claim 14, wherein the optical data link is operable to demodulate the detected optical signal, and configure an optical power of the optical data signal based on the demodulated signal.

16. The system according to claim 12, wherein the optical data link is operable to modulate the optical signal utilizing a modulator in the first transceiver and communicate the modulated optical signal to the second transceiver utilizing the optical fiber.

17. The system according to claim 16, wherein the optical data link is operable to detect the modulated optical signal and the optical data signal from the first transceiver utilizing a photodetector in the second transceiver.

18. The system according to claim 17, wherein the optical data link is operable to demodulate the detected optical signal, and configure optical power of the optical data signal based on the demodulated signal.

19. The system according to claim 12, wherein the optical data link is operable to configure an average value of the control signal by configuring an encoding density of the OCSi signal.

20. A system for communication, the system comprising:
an optical data link comprising an optical fiber, a local control system, a first transceiver at a first end of the optical fiber, and a second transceiver at a second end of the optical fiber, the optical data link being operable to:
communicate an optical data signal at frequencies greater than 10 kHz utilizing the optical fiber;
generate a control signal for the local control system at frequencies less than 10 Hz utilizing the optical fiber; and
communicate an optical service signal for an Optical Connection Service interface (OCSi) utilizing the optical fiber, wherein the optical service signal is generated by applying a modulation signal to the optical data signal at frequencies between 10 and 10 kHz.

* * * * *